Aug. 3, 1965    J. H. DEAN    3,198,175
DOG LEASH

Filed March 13, 1964    2 Sheets-Sheet 1

NYLON STRAP

PLIANT SQUEEZABLE PLASTIC

John H. Dean
INVENTOR.

Aug. 3, 1965   J. H. DEAN   3,198,175
DOG LEASH
Filed March 13, 1964                                    2 Sheets-Sheet 2
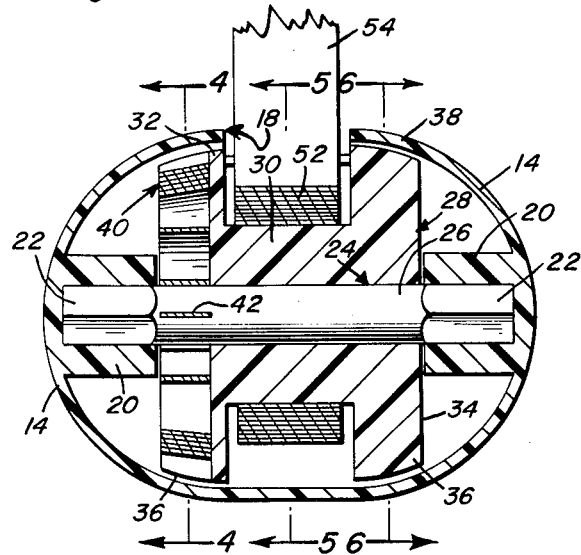
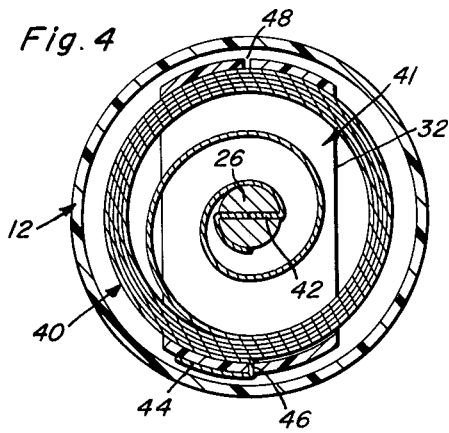
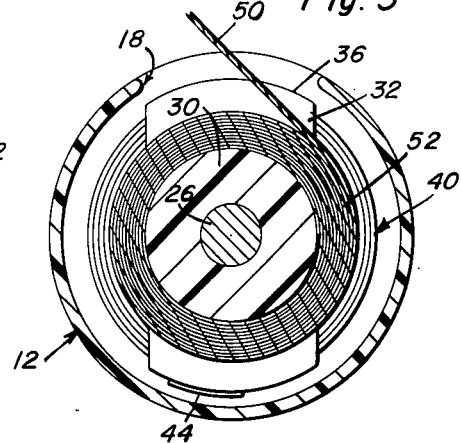
John H. Dean
INVENTOR.

United States Patent Office 3,198,175
Patented Aug. 3, 1965

3,198,175
DOG LEASH
John H. Dean, 116 Conrad Drive, Rochester 16, N.Y.
Filed Mar. 13, 1964, Ser. No. 351,656
2 Claims. (Cl. 119—109)

The present invention relates to a dog leash which is such in construction that it can be acceptably and effectively used with minimal effort on the part of the dog handler without discomforting the dog and which, like certain analogous prior art adaptations, is characterized by a spring-loaded reel-wound leach which, while it is normally attached to and left in position on the dog's collar, can be detached whenever necessary or desired.

The idea of winding and coiling a leash on a suitably housed spring-loaded drum or reel is old in the art as exemplified, for example, in Gottlieb's dog leash Patent 2,222,409. Gottlieb is also significant in that in addition to having a snap fastener for attachable and detachable use a hand-controlled brake for limiting the extent of movement of the leash strap is provided. Then, too, it is old in the art to mount a leash in a casing or housing which is such that the housed leash can be maintained in position on the dog collar in constant readiness for use. A leash assembly in which this aim is carried out is disclosed in Beebe 2,889,807. These prior reference patents are voluntarily cited here to show the general state of the art to which the present invention relates and to point out that in carrying out the present invention the foregoing results are not only attained but are achieved in a novel contribution to the art whose specific purposes and advantageous objectives will be hereinafter disclosed.

Briefly, the herein disclosed concept has to do with a snap fastener or an equivalent fastener detachably connectible with a link such as is customarily provided for leash-attaching purposes on a conventional-type dog collar. A forward end of a flat tape-like nylon band or leash is connected to a link which, in turn, is swivelly connected to the snap fastener thus permitting the leash to be attached and left in place on the dog's collar or detached in keeping with the wishes of the user.

More specifically, the invention comprises a simple hollow ball-like shell which functions as a comfortable and convenient handgrip for the user and, what is more important, has a slot which admits the rearward end of the leash into the hollow portion, the latter containing a spring-loaded drum or reel on which the leash is normally coiled.

It follows that with the construction so far described a reel-type leash has been devised which is possessed of advantageous features. It is amply small that it can be left on the dog's collar for any desired length of time—even permanently—or, if preferred, can be detached and carried on one's person in the pocket of a garment or in the handbag as the case may be. The leash itself is normally reeled on the spool or reel and is spring-wound and held and does not accidentally uncoil. At the same time, it can be immediately brought into play simply by catching hold of the housing and unwinding the leash in keeping with the limited restraint of the dog and judgment of the user, the dog owner.

In carrying out the preferred embodiment of the invention a specially constructed reel is mounted for rotation on a spindle supported in the hollow portion of the housing, the reel having end-heads which have peripheral surfaces proximal to encompassing surfaces of the housing. These surfaces are analogous to and function as friction brake shoes whereby when pliant squeezable surface portions of the housing encompassing the "brake shoes" are squeezed the desired quick-stop braking action is achieved.

A more general objective is to structurally, functionally and in other practical and feasible ways improve upon prior art reel-type leashes by providing one which is simple in construction, possessed of the desired features of economy, easy in practical use, and offers other practical features which contribute to the art.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a view on a larger scale with parts in section and elevation and which is a central longitudinal section;

FIGURE 4 is a view taken on the plane of the section line 4—4 of FIGURE 3; and

Figure 6:
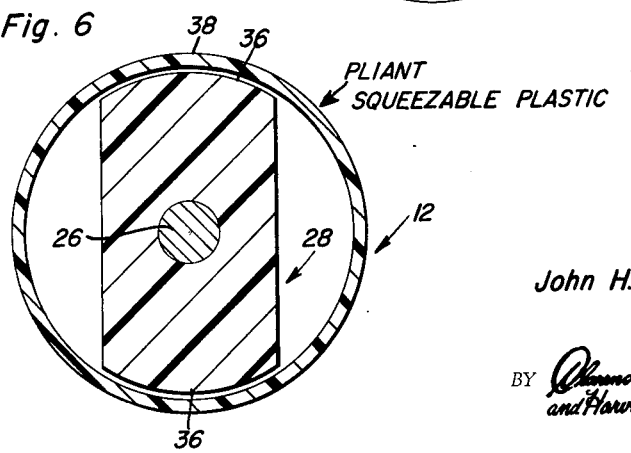

FIGURES 5 and 6 are similar sections taken on the section lines 5—5 and 6—6, respectively of FIG. 3.

Figure 1:
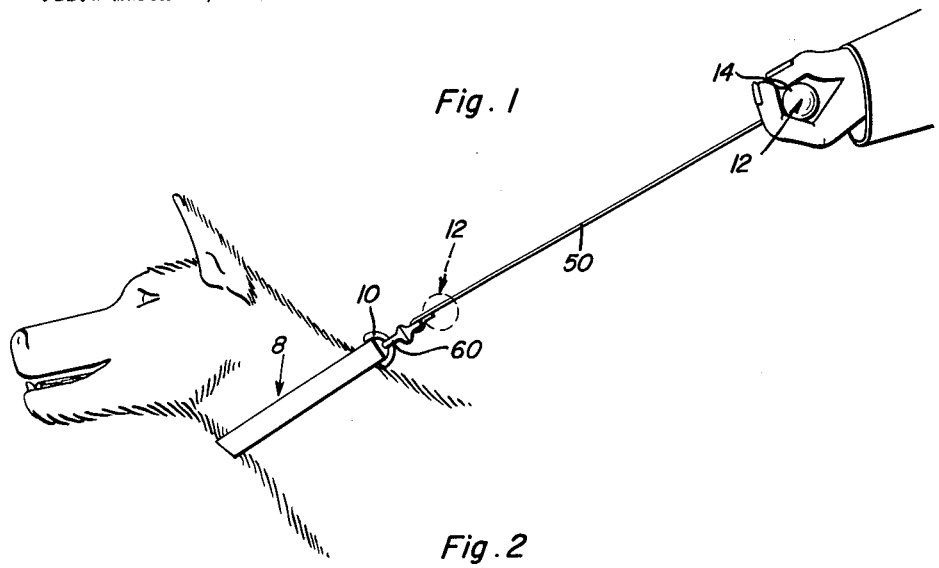
FIGURE 1 is a view in side elevation showing the overall combination; namely, the dog collar, improved extensible and retractible leash, how the forward end is connected to the collar, how the housing is used as a handle in full lines and how it can be let go of and carried on the dog in dotted lines.

Referring first to FIG. 1 the numeral 8 designates any appropriately or suitably constructed dog collar capable of being comfortably worn on the dog's neck and which, as is usual, is provided with a ring or link 10 to permit the attachment thereto of an appropriate leash.

Figure 2:
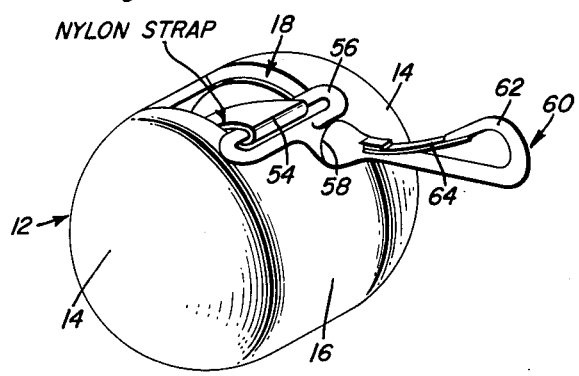
FIGURE 2 is a view in perspective which is substantially full size and with the invention detached from the dog's collar and with certain of the significant parts disclosed.

With reference now to FIG. 2 the multipurpose polyethylene or equivalent ball-like shell is denoted by the numeral 12 and is capable of being conveniently encircled and grasped by the thumb and fingers and held in the palm of the hand in the manner appearing at the right in FIG. 1. This is a molded plastic shell which has concavo-convex axially aligned end portions 14 and an intervening generally cylindrical body portion 16 having an elongated leash slot 18. As shown in FIG. 3 the internal concaved axial portions of the respective ends 14 are provided with aligned socket members 20 in which the non-circular end portions 22 of the axle or spindle 24 are keyed. The smooth central portion of this spindle, denoted at 26, serves as a journal for the spring-loaded drum or reel 28. The hub portion 30 is provided (FIG. 3) at the left and right ends with elongated block-like heads one of which is denoted at 32 and the other one at 34. The round ended straight edged marginal or peripheral surfaces 36 of the heads, constitute and provide friction-type brake shoes. These friction surfaces or brake shoes are proximal to, that is slightly spaced from the encompassing cylindrical end portions 38 of the body part of the shell or housing and are of pliant squeezable plastic whereupon when the user imposes finger pressure thereon the deformed portions have the capacity of firmly and frictionally gripping the brake shoes, that is heads 32 and 34, in a manner to stop the rotation thereof. The reel is turnable in conjunction with a coil spring 40 which is fitted into recess means provided therefor at 41 in the lefthand end portion of the head 32. It will be observed that the inner end portion 42 of the innermost convolution of the spring is fixed on the spindle as brought out in FIG. 4. The outermost convolutions are seated in the recess in the head and the terminal end portion of the outermost convolution 44 (FIG. 4) is threaded through a slot 46 provided therefor and is bent back and anchored in place. Another slot 48 is provided at a diametrically opposite point for anchorage of the end portion 44 if the tensioning of the spring requires it. Accordingly the coil spring is anchored at one end on the reel head and at the other end on the relatively stationary spindle with the result that the tension of the spring tends to always return the reel or drum to the position illustrated in the drawings (FIGS. 3, 4 and 5).

The leash comprises a flat strap or band-type nylon element 50 which is of appropriate width and cross-section and length—usually about 6 feet more or less in length. The inner end portion of this strap 50 is fixed to the surface of the hub 30. The median or major portion is coiled or reeled on the hub as denoted at 52. The free terminal end portion (FIG. 2) is denoted at 54 and is connected with an appropriate rigid link 56 a portion of which is swivelly connected at 58 to a snap fastener 60. The hook 62 is releasably engaged with the aforementioned ring 10. The spring latch 64 and functions as a catch in the usual manner. With this construction the snap fastener is being connected with the collar 8 by way of the link 10 and since the leash is normally spring-wound and consequently coiled it will be evident that the improved leash can be permitted to remain in the ready-to-use dotted line position illustrated in FIG. 1. When one desires to bring the leash into play the housing, which then becomes handle means, is grasped in the palm of the hand and with the fingers and the leash is allowed to unwind as a result, normally speaking, of the dog taking off. On the other hand it will be evident that by firmly catching hold and squeezing the pliant portions of the body part 16, for example, the portion 38 in FIG. 6 against the surface 36 the desired braking action can be brought into play thus making it possible to apply the brake whenever necessary or desired.

It is also within the purview of the invention to construct the shell or housing 12 of luminous or light-reflecting colorful plastic material so that in addition to being attractive it is capable of being seen at night. Perhaps too the tape or strap-type leash could be made of illuminable material.

The herein disclosed invention is functionally designed and structurally adapted to aptly serve the purposes for which it is intended and is accordingly adaptable for practical use on small, large and medium size dogs. As presently made it has been ascertained that the leash functions well up to its estimated breaking point (180 lbs. pull). The spring is made of stainless steel and, in conjunction with other component parts, is virtually weatherproof. Then, too, the chances of the extended leash or tape being "scratched down" or getting caught on a fence or the like and causing trouble to either the owner or his dog are small indeed and are no cause for apprehension.

It is believed that a careful consideration of the specification in conjuction with the views of the drawings will enable the reader to obtain a clear and comprehensive understanding of the component parts singly and collectively and precisely how they are constructed and arranged in the novel environmental association under advisement. Likewise, the features and advantages and mode of use should now be clear. Accordingly, a more extended description is regarded as unnecessary.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A dog leash comprising a hollow elongated ovate sheet material shell provided with axially aligned concavo-convex end portions joined by an intervening generally cylindrical body portion, said shell being of a length, size and weight that it can be conveniently and comfortably held in the hand of the user when being used, said body portion having a leash-accommodating slot, a shaft located in the hollow portion of said shell with its respective end portions fixed in place and connected with axial portions of the concavo-convex end portions, said shaft being provided intermediate its ends with a journal and said journal registering with and bridging said slot, a reel confined in the hollow portion of said shell and having a hub portion freely turnable on said journal and provided at its respective ends with heads, one of said heads having a coil spring incorporated therein, said coil spring having one end attached to said one head and the other end fixedly attached to said shaft, an elongated tape constituting the aforementioned leash and having an inner end attached to and wound on said hub between said heads and an outer end portion slidingly operable in and through said slot, said outer end being provided with a link and a complemental snap fastener, said snap fastener being swivelly joined to said link, the portions of said body portion encircling and proximal to the respective heads being yieldingly resilient and manually squeezed by the fingers of the hand of the user and compressed into gripping engagement with the respective heads in a manner to provide the desired at will brake action.

2. The structure defined in claim 1 and wherein said heads are of elongated block-like form, each head having diametrically opposite rounded ends and straight longitudinal marginal edge portions.

References Cited by the Examiner

UNITED STATES PATENTS

| 2,031,501 | 2/36 | Porter | 242—99 |
| 2,222,409 | 11/40 | Gottlieb | 119—109 X |
| 2,314,504 | 3/42 | Lifchultz | 119—96 X |
| 2,919,676 | 1/60 | Schneider | 119—109 |

FOREIGN PATENTS 788,170  12/57  Great Britain.

SAMUEL KOREN, *Primary Examiner.*

HUGH R. CHAMBLEE, *Examiner.*